United States Patent
Kong et al.

(10) Patent No.: US 10,744,909 B2
(45) Date of Patent: Aug. 18, 2020

(54) HEIGHT ADJUSTMENT APPARATUS OF VEHICLE SEAT

(71) Applicants: Hyundai Motor Company, Seoul (KR); KIA Motors Corporation, Seoul (KR); DAS CO., LTD, Gyeongju-su, Gyeongsangbuk-do (KR)

(72) Inventors: Ju Yeol Kong, Ansan-si (KR); Gil Ju Kim, Seoul (KR); Jung Sang You, Hwaseong-si (KR); Seon Chae Na, Yongin-si (KR); Chan Ho Jung, Gunpo-si (KR); Hyoung Jun Ham, Hwaseong-si (KR); Jae Hwan Lee, Suwon-si (KR); Dong Man Lee, Suwon-si (KR)

(73) Assignees: HYUNDAI MOTOR COMPANY, Seoul (KR); KIA MOTORS CORPORATION, Seoul (KR); DAS CO., LTD., Gyeongju-si, Gyeongsangbuck-Do (KR)

( * ) Notice: Subject to any disclaimer, the term of this patent is extended or adjusted under 35 U.S.C. 154(b) by 0 days.

(21) Appl. No.: 16/356,563

(22) Filed: Mar. 18, 2019

(65) Prior Publication Data

US 2020/0164772 A1    May 28, 2020

(30) Foreign Application Priority Data

Nov. 26, 2018   (KR) ........................ 10-2018-0147147

(51) Int. Cl.
*B60N 2/10*    (2006.01)
*B60N 2/16*    (2006.01)
*B60N 2/02*    (2006.01)

(52) U.S. Cl.
CPC ......... *B60N 2/1615* (2013.01); *B60N 2/0232* (2013.01); *B60N 2/10* (2013.01);
(Continued)

(58) Field of Classification Search
CPC ...... B60N 2/1615; B60N 2/164; B60N 2/165; B60N 2/1695; B60N 2/10
See application file for complete search history.

(56) References Cited

U.S. PATENT DOCUMENTS 6,021,990 A * 2/2000 Freund ................ B60N 2/0232
                                                      248/429
10,358,052 B1 * 7/2019 Mizukoshi ........... B60N 2/1655
(Continued)

FOREIGN PATENT DOCUMENTS

CN    105358368 A     2/2016
DE    19914163 A1 *  10/2000  ............. B60N 2/164
(Continued)

OTHER PUBLICATIONS

Extended European Search Report for European Application No. 18205597.0, dated Jul. 29, 2019, 8 pgs.
(Continued)

*Primary Examiner* — Timothy J Brindley
(74) *Attorney, Agent, or Firm* — Brinks Gilson & Lione (57) ABSTRACT

The present disclosure relates to a height adjustment apparatus of a vehicle seat, whereby during a height adjustment of a seat cushion, a desired tilting angle of the seat cushion is obtained and heights of a front part and a rear part of the seat cushion are individually adjusted. Due to the height adjustment apparatus, the comfort of a seated occupant is improved by adjusting the angles of the seat cushion in response to various postures of the occupant. In addition, a link connection is structurally secured and thus its durability is also improved.

14 Claims, 8 Drawing Sheets

(52) U.S. Cl.
CPC ........... B60N 2/165 (2013.01); B60N 2/1695 (2013.01); *B60N 2002/0236* (2013.01)

(56) References Cited

U.S. PATENT DOCUMENTS

| | | | | |
|---|---|---|---|---|
| 2009/0230752 | A1* | 9/2009 | Adragna | B60N 2/1615 297/463.1 |
| 2011/0210586 | A1 | 9/2011 | Masutani | |
| 2014/0361592 | A1 | 12/2014 | Kuno | |
| 2018/0001793 | A1* | 1/2018 | Pleskot | B60N 2/62 |
| 2019/0061568 | A1* | 2/2019 | Hirata | B60N 2/165 |
| 2019/0152352 | A1* | 5/2019 | Handigol | B60N 2/12 |
| 2019/0308527 | A1* | 10/2019 | Nakamura | B60N 2/10 |
| 2020/0009996 | A1* | 1/2020 | Brodersen | B60N 2/1896 |

FOREIGN PATENT DOCUMENTS

| | | | | |
|---|---|---|---|---|
| DE | 10113153 C1 * | 4/2002 | ........... | B60N 2/1803 |
| DE | 102011122275 A1 * | 6/2013 | ........... | B60N 2/1695 |
| DE | 102013101540 A1 * | 8/2014 | ......... | B60N 2/42763 |
| DE | 102016015170 A1 * | 6/2018 | ............. | B60N 2/181 |
| EP | 0 575 243 A1 | 12/1993 | | |
| EP | 2 567 861 A1 | 3/2013 | | |
| FR | 2 157 671 A5 | 6/1973 | | |
| FR | 2 901 196 A1 | 11/2007 | | |
| FR | 2 911 817 A1 | 8/2008 | | |
| FR | 3058943 B1 * | 11/2018 | ............. | B60N 2/169 |
| GB | 2018583 A * | 10/1979 | ........... | B60N 2/1675 |
| JP | 2004306923 A | 11/2004 | | |
| JP | 2006001388 A | 1/2006 | | |
| JP | 2007308050 A * | 11/2007 | ............. | B60N 2/168 |
| JP | 2009-520638 A | 5/2009 | | |
| JP | 2009202844 A | 9/2009 | | |
| JP | 2009227011 A | 10/2009 | | |
| JP | 2013035517 A | 2/2013 | | |
| JP | 2017019441 A | 1/2017 | | |
| KR | 20030049786 A | 6/2003 | | |
| KR | 101526979 B1 | 6/2015 | | |
| KR | 101557098 B1 | 10/2015 | | |
| KR | 20180005344 A | 1/2018 | | |
| WO | WO-2008099538 A1 * | 8/2008 | ........... | B60N 2/1615 |
| WO | WO-2012036212 A1 * | 3/2012 | ........... | B60N 2/7094 |
| WO | WO-2018020836 A1 * | 2/2018 | ........... | B60N 2/1615 |

OTHER PUBLICATIONS

Korean Office Action dated Oct. 29, 2019 from the corresponding Korean Application No. 10-2018-0033293, 6 pp.

* cited by examiner

HEIGHT ADJUSTMENT APPARATUS OF VEHICLE SEAT

CROSS REFERENCE TO RELATED APPLICATION

This application claims priority to and the benefit of Korean Patent Application No. 10-2018-0147147, filed on Nov. 26, 2018, which is incorporated herein by reference in its entirety.

FIELD

The present disclosure relates to a position adjustment apparatus of a seat for a vehicle.

BACKGROUND

The statements in this section merely provide background information related to the present disclosure and may not constitute prior art.

Generally, a car includes front seats in which a driver and a passenger are seated and rear seats behind the front seats for additional passengers, and the seats include various comfortable equipment for improving convenience of the driver and passengers.

For example, the equipment mounted to a seat includes a seat position adjustment device controlling a position of a seat by moving the seat in forward/rearward directions according to a body type of a passenger, a reclining device adjusting the inclination of a seat back, and a height adjustment device adjusting a height of the seat.

Recently, as the development of an autonomous vehicle is being increased, a seat position adjustment device is being applied more widely. However, we have discovered that as for a conventional height adjustment device, a height adjustment angle in the seat of the vehicle is not sufficiently obtained, which does not respond to various postures of a passenger, and a seat height adjustment is performed only by a specific link, which lowers durability.

The above information disclosed in this Background section is only for enhancement of understanding of the background of the present disclosure, and therefore it may contain information that does not form the prior art that is already known to a person of ordinary skill in the art.

SUMMARY

The present disclosure relates to a height adjustment apparatus of a vehicle seat. Due to the height adjustment apparatus of a seat cushion in the present disclosure, a desired tilting angle and height of the seat cushion is obtained. Accordingly, a seat comfort for an occupant is improved in response to various postures of the occupant.

According to one aspect of the present disclosure, the height adjustment apparatus of a vehicle seat having a cushion frame, a position of which is adjusted in upward/downward directions on a seat rail includes a height link, which has a plurality of links, rotatably coupled to a side frame of the cushion frame and to the seat rail and allowing the cushion frame to be moved in the upward/downward directions by the plurality of links being unfolded or folded, a drive unit provided on the cushion frame and including a power transmission part changeable in a length in forward/rearward directions during an operation of the drive unit, and a drive mechanism connected to the power transmission part and the height link so as to operate in cooperation with the drive unit and the height link such that as the length of the power transmission part increases during the operation of the drive unit, the plurality of links constituting the height link unfolds for the cushion frame to lift.

According to a further aspect of the present disclosure, the height link may include a first link rotatably provided on the seat rail and a second link rotatably provided on the side frame, and the first link and the second link may be rotatably coupled to each other. A guide slot curvedly extended as an arc shape may be provided on the side frame, and a guide part may be provided on a connection portion between the first link and the second link of the height link, and the guide part may be placed in and passes through the guide slot. After the guide slot extends downward from an upper side thereof, the guide slot may be configured to extend in an advancing direction of the power transmission part.

According to a further aspect of the present disclosure, the first link may be provided by extending so as to bend upward and a reinforcement bead may be provided by bending along an edge of the first link.

According to a further aspect of the present disclosure, the drive unit may include a drive motor fixed to the cushion frame and the power transmission part advancing and withdrawing during an operation of the drive motor, and the drive motor may be provided to incline upward such that the power transmission part advances to incline upward.

According to a further aspect of the present disclosure, the drive mechanism may include a rotation link rotatably provided on a front end of the power transmission part, a first connection bar, each of opposite ends of which is rotatably connected to a connection portion between the first link and the second link and being in contact with a front end part of the rotation link, and a second connection bar, each of opposite ends of which is rotatably connected to a connection portion between the second link and the side frame and being connected to an end part of the rotation link.

The rotation link may include a holding part provided on the front end part thereof such that the first connection bar is placed in the holding part so as to be held in and connected to the holding part.

The first connection bar may include a middle portion being in contact with the front end part of the rotation link and a connection end portion connected to the connection portion between the first link and the second link after each of opposite ends of the first connection bar bends.

According to a further aspect of the present disclosure, the height adjustment apparatus may further include a gear link, a first end part of which is rotatably provided on the seat rail and a second end part of which is rotatably provided on the cushion frame and having gear teeth provided on a portion of a circumference of the gear link, and an operation unit provided on the cushion frame and having a drive gear engaged with the gear teeth of the gear link. In addition, the gear link may be rotated on the seat rail by a rotation of the drive gear during an operation of the operation unit so as to lift and lower the cushion frame.

An extension slot may be provided on the gear link, and the extension slot is extended curvedly along a curve of the gear teeth that is extended. A protrusion may be provided on the side frame so as to be placed in the extension slot.

The height link, the drive unit, and the drive mechanism may be provided on front portions of the seat rail and the cushion frame, and the gear link and the operation unit may be provided on rear portions of the seat rail and the cushion frame.

The height adjustment apparatus may further include a controller controlling the drive unit and the operation unit, and the controller may operate the drive unit and the operation unit so as to adjust a height and an angle of the cushion frame such that a hip-point of a seated passenger is changed.

When the controller operates the drive unit and the operation unit to adjust the height of the cushion frame, the plurality of links constituting the height link may be rotated and unfolded by the operation of the drive unit and the gear link may be rotated by the operation of the operation unit, so that the hip-point may be changed while tracing a curve forward.

When the controller operates the drive unit so as to adjust the angle of the cushion frame, the plurality of links constituting the height link may be rotated and unfolded by the operation of the drive unit, so that the hip-point may be changed while tracing a curve rearward.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
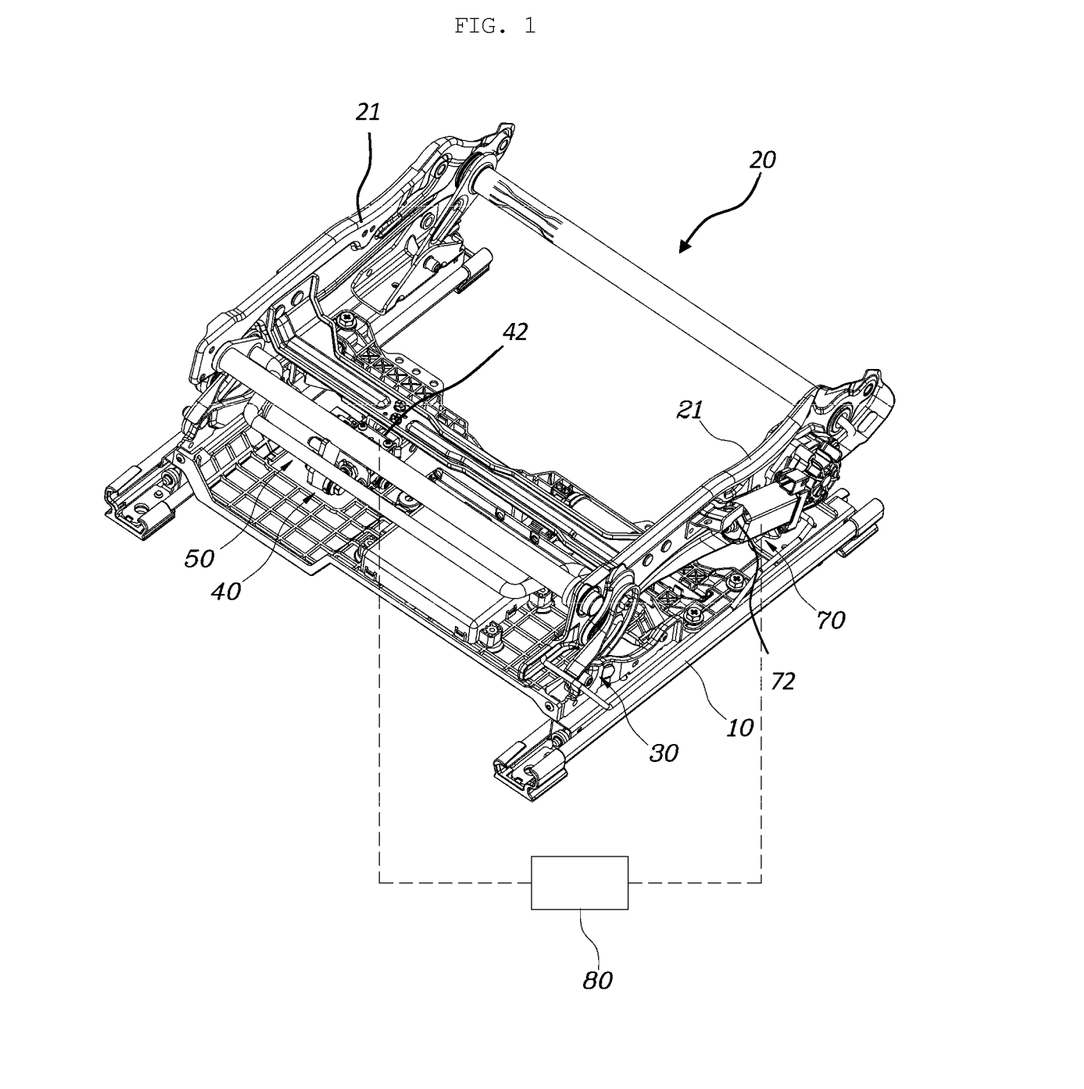
FIG. 1 is a view showing a height adjustment apparatus of a vehicle seat according to an exemplary form of the present disclosure.
Figure 2:
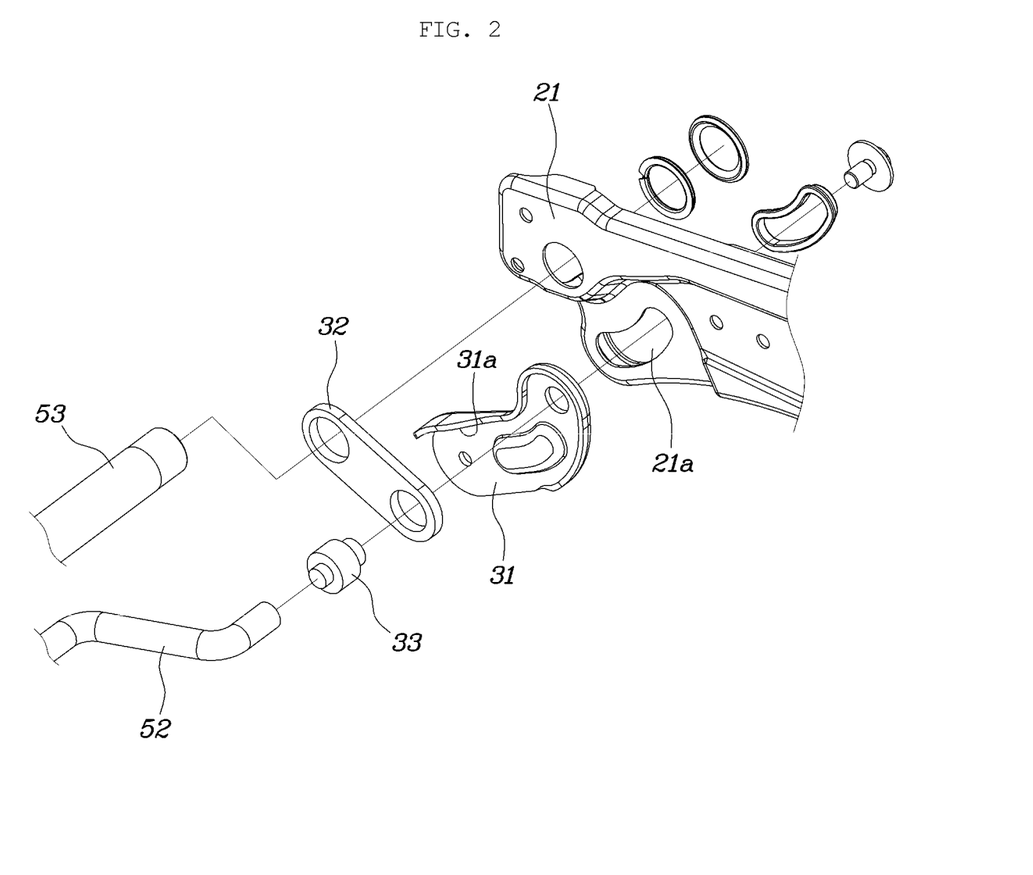
FIG. 2 is an exploded view of a drive unit in the height adjustment apparatus of the vehicle seat shown in FIG. 1.
Figure 3:
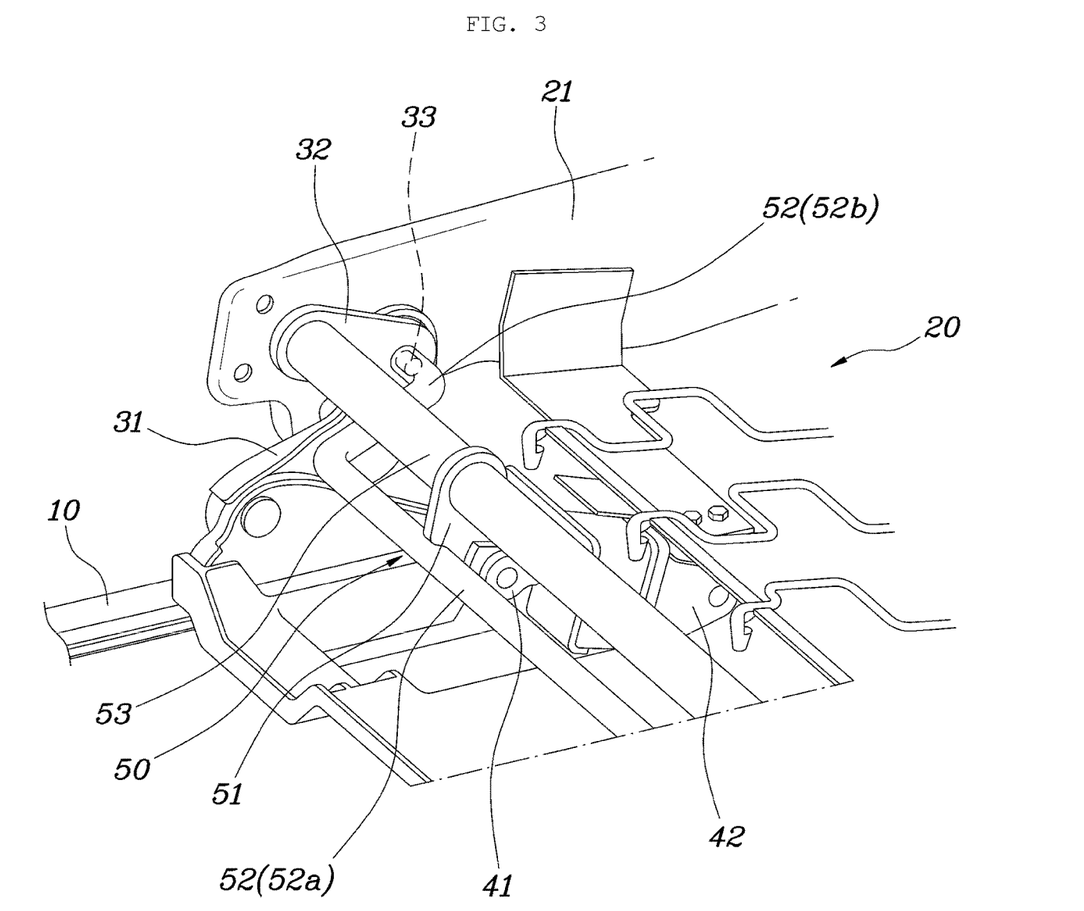
FIGS. 3 to 5 are detailed views illustrating the drive unit of the height adjustment apparatus shown in FIG. 1.

Referring to FIGS. 1 to 3, the height adjustment apparatus of a vehicle seat according to the present disclosure includes a height link 30, which has a plurality of links, rotatably coupled to each of opposing side frames 21 of a cushion frame 20, and to each of opposing seat rails 10 and allowing the cushion frame 20 to be moved in upward/downward directions by the plurality of links being unfolded or folded. In addition, a drive unit 40 is provided on the cushion frame 20 and includes a power transmission part 41 changeable in a length in forward/rearward directions during an operation of the drive unit 40. A drive mechanism 50 is connected to the power transmission part 41 and the height link 30 so as to operate in cooperation with the drive unit and the height link 30 such that as the length of the power transmission part 41 increases during the operation of the drive unit 40, the plurality of links constituting the height link 30 unfolds for the cushion frame 20 to lift.

That is, during the operation of the drive unit 40 on the seat rail 10, the drive mechanism 50 receives a power of the drive unit 40 and allows the height link 30 to unfold or fold such that a position of the cushion frame 20 is adjusted in the upward/downward directions.

As shown in FIGS. 1 to 3, the present disclosure includes the height link 30, the drive unit 40, and the drive mechanism 50, each of which may be provided in a pair on the opposing side frames 21 of the cushion frame 20 and the opposing seat rails 10. In addition, the height link 30 has the plurality of links, and each of the links is rotatably coupled to each of the side frames 21 of the cushion frame 20 and to the seat rails 10. The drive unit 40 is provided on the cushion frame 20 and includes the power transmission part 41 changed in height by advancing and withdrawing during the operation of the drive unit 40. The power transmission part 41 of the drive unit 40 and the height link 30 are connected to each other by the drive mechanism 50 so as to operate in cooperation with each other, so that when the length of the power transmission part 41 is increased by an advancement of the power transmission part 41 during the operation of the drive unit 40, the drive mechanism 50 pushes the height link 30 to unfold the plurality of links. Accordingly, when the plurality of links constituting the height link 30 is unfolded, a height of each of the links increases in a vertical direction, and the cushion frame 20 lifts as much as the height of each of the links increasing in the vertical direction. According to the operation of the drive unit 40, therefore, a height of a seat cushion may be adjusted.

For specifically describing the operation of the drive unit 40 in FIGS. 2 and 3, the height link 30 may include a first link 31 rotatably provided on the seat rail 10 and a second link 32 rotatably provided on the side frame 21. In addition, the first link 31 and the second link 32 may be rotatably coupled to each other.

Accordingly, the height link 30 includes the first link 31 and the second link 32 and may be unfolded or folded by relative rotations of the first link 31 and the second link 32. That is, since the first link 31 is provided on the seat rail 10 and the second link 32 is provided on the side frame 21, the first link 31 and the second link 32 are arranged by being spaced apart from each other at a lower side and an upper side, respectively. Furthermore, since the first link 31 and the second link 32 are rotatably coupled to each other, a vertical height of the side frame 21 decreases while the first link 31 and the second link 32 fold and the vertical height of the side frame 21 increases while the first link 31 and the second link 32 unfold.

As shown in FIGS. 2 and 3, a guide slot 21a of an arc shape extending curvedly may be provided on the side frame 21, and a guide part 33 may be provided on a connection portion between the first link 31 and the second link 32 of the height link 30. Furthermore, the guide part 33 may be inserted into and passes through the guide slot 21a. Accordingly, when the height link 30 is rotated by the operation of the drive unit 40, the guide part 33 provided on the height link 30 moves along the guide slot 21a so as to guide the unfolding or folding of the first link 31 and the second link 32 constituting the height link 30. In addition, the guide part 33 connected to the first link 31 and the second link 32 is inserted into (placed in) and supported by the guide slot 21a, whereby rigidity of the height link 30 is structurally secured.

Accordingly, an entire durability of the height link 30 is improved and a stable operation of the structure is accomplished.

After the guide slot 21a extends downward from an upper side thereof, the guide slot 21a is configured to extend in an advancing direction of the power transmission part 41. Accordingly, when the guide part 33 moves along the guide slot 21a, the unfolding movements of the first link 31 and the second link 32 are stably guided and rotating movements of the first link 31 and the second link 32 are efficiently performed such that discomfort of the passenger caused by a height adjustment can be reduced.

Meanwhile, as shown in FIG. 2, the first link 31 may be provided by extending so as to bend upward and a reinforcement bead 31a may be provided by bending along an edge of the first link. Accordingly, since the bended first link 31 is provided by extending curvedly, a length of the first link 31 may be increased, and during the unfolding movement of the height link 30, which is folded, a height of the connection portion between the first link 31 and the second link 32 may be increased. Accordingly, during the height adjustment of the seat cushion, a tilting angle of the seat cushion may be increased because of the first link 31.

In addition, the reinforcement bead 31a is provided on the edge of the first link 31 so as to increase an entire rigidity of the first link 31. As shown in FIG. 2, the reinforcement bead 31a may be provided on a curved portion so as to increase a rigidity of the curved portion.

Figure 4:
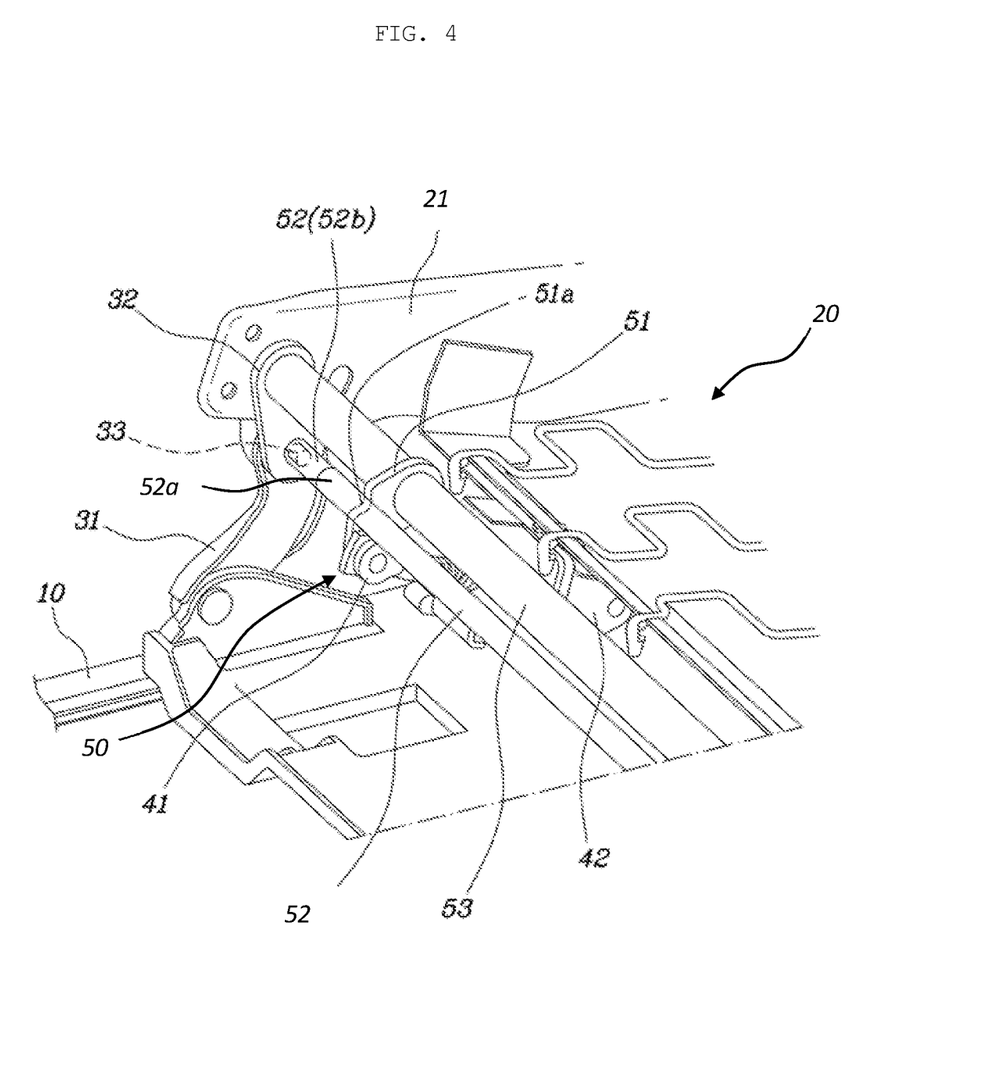
Figure 5:
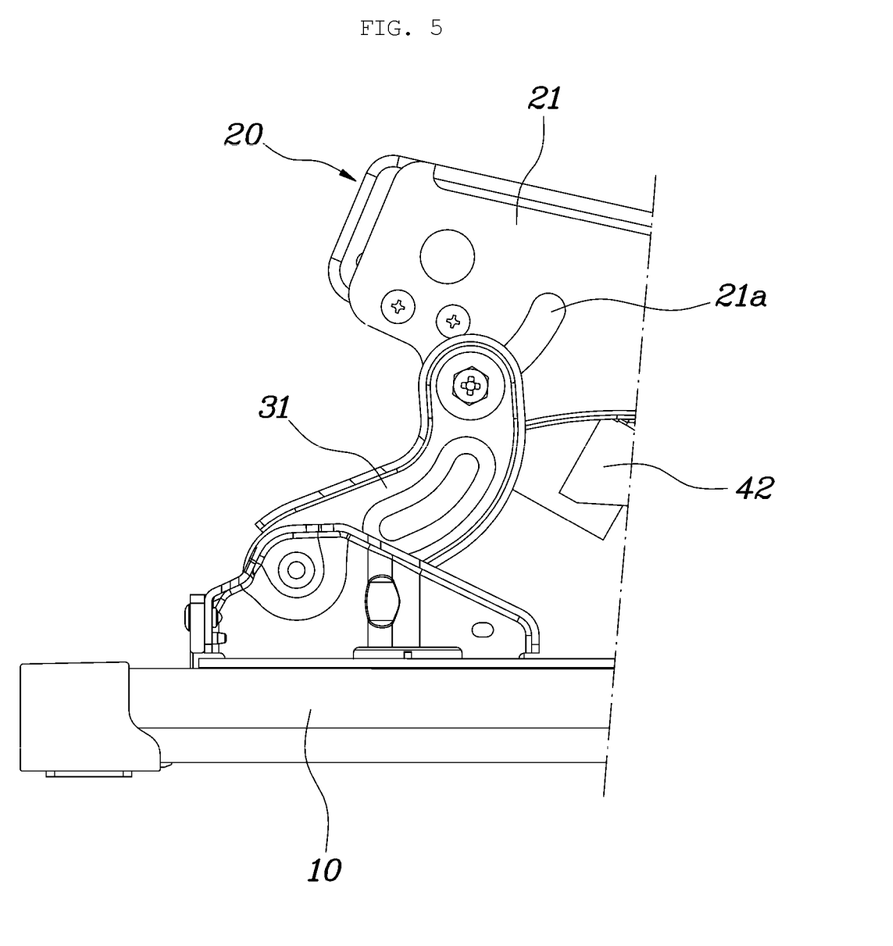

Meanwhile, as shown FIGS. 3 and 4, the drive unit 40 (see FIG. 1) may include a drive motor 42 fixed to the cushion frame 20 by a motor bracket (not shown) and the power transmission part 41 advancing and withdrawing during an operation of the drive motor 42, wherein the drive motor 42 is provided to incline upward such that the power transmission part 41 may advance to incline upward.

The drive motor 42 may include a motor rotatable clockwise/counterclockwise, and the power transmission part 41 may be made of a screw so as to advance/withdraw while transferring a rotational power of the drive motor 42. As the drive motor 42 is provided on the cushion frame 20 so as to incline upward, the power transmission part 41 advances to incline upward. Accordingly, the drive mechanism 50 connected to the power transmission part 41 also receives a power for moving upward, and the height link 30 connected to the drive mechanism 50 also receives a power for moving inclinedly forward and upward, so that the cushion frame 20 may be operated to lift.

As shown in FIGS. 1 and 3 to 5, the drive mechanism 50 includes a rotation link 51 rotatably provided on a front end of the power transmission part 41, a first connection bar 52, each of opposite ends of which is rotatably connected to the connection portion between the first link 31 and the second link 32 and being in contact with a front end part of the rotation link 51, and a second connection bar 53, each of opposite ends of which is rotatably connected to a connection portion between the second link 32 and the side frame 21 and being connected to an end part of the rotation link 51.

As described above, the drive mechanism 50 includes the rotation link 51, the first connection bar 52, and the second connection bar 53. In addition, the rotation link 51 is rotatably provided on the front end of the power transmission part 41, and the first connection bar 52 and the second connection bar 53 are connected to the front end part of the rotation link 51 and the end part thereof, respectively, while being spaced apart from each other, whereby the rotation link 51 connected to the first connection bar 52 and the second connection bar 53 may rotate in cooperation with the power transmission part 41 moving during the operation of the drive unit 40.

As shown in FIGS. 3 and 4, the rotation link 51 may include a holding part 51a provided on the front end part thereof such that the first connection bar 52 is mounted to the holding part 51a so as to be held in and connected to the holding part 51a. Furthermore, the rotation link 51 may include the second connection bar 53 rotatably combined on the end part thereof. For example, the end part of the rotation link 51 may have a hole for rotatably connecting with the second connection bar 53.

Since the first connection bar 52 and the second connection bar 53 are arranged at different positions each other on the rotation link 51, the first connection bar 52 may be connected to the connection portion between the first link 31 and the second link 32, and the second connection bar 53 may be connected to the connection portion between the second link 32 and the side frame 21. Particularly, referring to FIGS. 3 and 4, when the power transmission part 41 is advanced by the operation of the drive unit 40, the connection portion between the first link 31 and the second link 32 moves forward, and the connection portion between the second link 32 and the side frame 21 moves upward, so that moving positions of the first connection bar 52 and the second connection bar 53 are different.

Accordingly, the first connection bar 52 is connected to the front end part of the rotation link 51 and the second connection bar 53 is connected to the end part of the rotation link 51, and as the rotation link 51 rotates on the power transmission part 41 during the operation of the drive unit 40, the first connection bar 52 and the second connection bar 53 move the first link 31 and the second link 32 of the height link 30 so as to fold or unfold the height link 30.

Meanwhile, the first connection bar 52 may include a middle portion 52a being in contact with the front end part of the rotation link 51 and a connection end portion 52b connected to the connection portion between the first link 31 and the second link 32 after each of opposite ends of the first connection bar 52 bends. Accordingly, the first connection bar 52 may be efficiently connected to the rotation link 51 provided on the power transmission part 41. In addition, the middle portion 52a is pushed and moved by the power transmission part 41 and the rotation link 51 advancing during the operation of the drive unit 40, and while the middle portion 52a rotates relative to the connection end portion 52b connected to the connection portion between the first link 31 and the second link 32, an efficient operation between the drive unit 40 and the height link 30 may be performed.

Meanwhile, in the present disclosure, the height adjustment may be performed by the height link 30, the drive unit 40, and the drive mechanism 50 described above and also by components described hereinafter.

Figure 6:
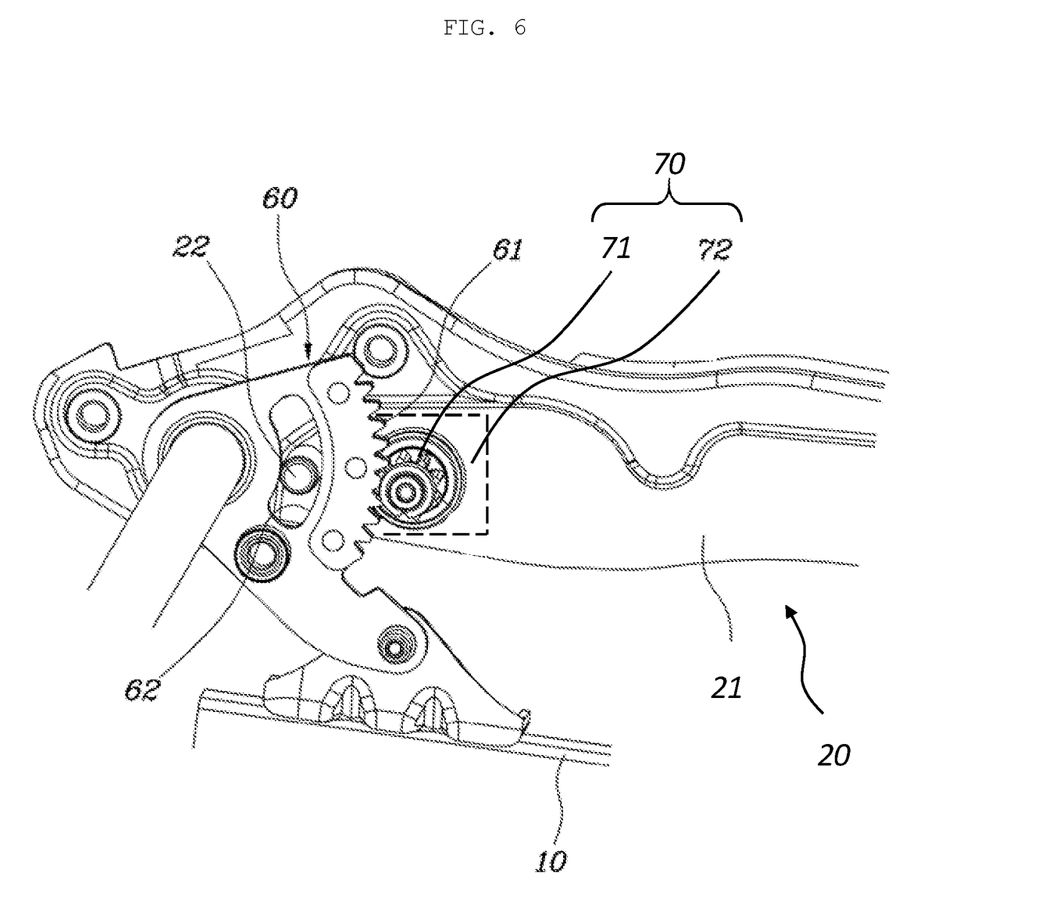
FIG. 6 is a detailed view illustrating an operation unit of the height adjustment apparatus shown in FIG. 1.

Referring to FIG. 6, the height adjustment apparatus may further include a gear link 60, a first end part of which is rotatably provided on the seat rail 10 and a second end part of which is rotatably provided on the cushion frame 20 and having gear teeth 61 provided on a portion of a circumference of the gear link, and an operation unit 70 provided on the cushion frame 20 and having a drive gear 71 engaged with the gear teeth 61 of the gear link 60. In addition, the gear link 60 is rotated on the seat rail 10 by a rotation of the drive gear 71 during an operation of the operation unit 70 so as to lift and lower the cushion frame 20.

The gear link 60 may be provided in a shape of a sector gear, and the operation unit 70 may further include an operation motor 72 (see FIG. 1) transferring the rotational power to the drive gear 71. Accordingly, the drive gear 71 is rotated by the operation of the operation motor 72, and the gear link 60 engaged with the drive gear 71 by the gear teeth 61 receives the rotational power and the gear link 60 is rotated on the seat rail 10. Accordingly, the cushion frame 20 may be pushed or pulled to move upward/downward.

As shown in FIG. 6, an extension slot 62 may be provided on the gear link 60. The extension slot 62 extends curvedly along a curve of the gear teeth 61, and a protrusion 22 may be provided on the side frame 21 so as to be inserted into or placed in the extension slot 62. Accordingly, as during the operation of the operation unit 70, the gear link 60 rotates along the extension slot 62 of the gear link 60 into which the protrusion 22 is inserted, the cushion frame 20 may be guided so as to efficiently lift and lower. In addition, the protrusion 22 is inserted into and supported by the extension slot 62 formed on the gear link 60, whereby rigidity is secured. Accordingly, an entire durability is improved and a stable operation of the structure is achieved.

Figure 7:
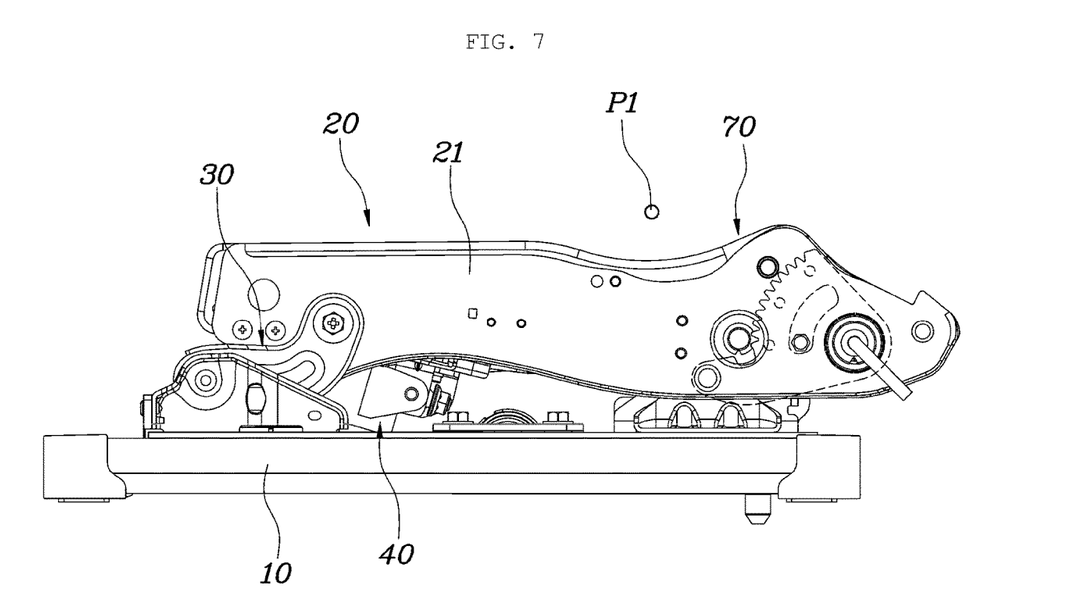
FIGS. 7 to 9 are side views of the controlled height adjustment apparatus of the vehicle seat with various hip positions of an occupant according to a form of the present disclosure.

According to a form of the present disclosure, as shown in FIGS. 1 and 7, the height link 30, the drive unit 40, and the drive mechanism 50 may be provided on front portions of the seat rail 10 and the cushion frame 20, and the gear link 60 and the operation unit 70 may be provided on rear portions of the seat rail 10 and the cushion frame 20. Since the height link 30, the drive unit 40, and the drive mechanism 50 are configured to have a relatively wide height adjustment range, the tilting angle of a front part of the seat cushion may be increased, and since the gear link 60 and the operation unit 70 are configured to have a relatively high rigidity, a weight of a passenger may be securely supported. In addition, the tilting angle of the seat cushion can be variously achieved by a selective control or a simultaneous control of the drive unit 40 and the operation unit 70.

An operation of the present disclosure will be described below in detail.

Referring back to FIG. 3, in an initial state of the seat cushion, the power transmission part 41 of the drive unit 40 is withdrawn and the first link 31 and the second link 32 of the height link 30 are folded together. Accordingly, the guide part 33 provided on the connection portion between the first link 31 and the second link 32 is positioned at rearward end of the guide slot 21a in a fore/aft direction of the vehicle.

As shown in FIG. 4, when the power transmission part 41 of the drive unit 40 advances, the rotation link 51 mounted on the power transmission part 41 pushes the first connection bar 52 and the second connection bar 53 toward a front upper side. In this case, while the rotation link 51 rotates on the power transmission part 41, the guide part 33 moves forward along the guide slot 21a, the first link 31 rotates in a vertical direction, and the second link 32 also rotates in the vertical direction in cooperation with the second connection bar 53, so that the cushion frame 20 is lifted. A curvature radius of the guide slot 21a, a curvature radius according to a shape of the first link 31, and curvature radii of the middle portion 52a of the first connection bar 52 and the second connection bar 53 rotated may have similar curvature radii, but only the first link 31 rotates in a direction contrary thereto so as to lift the cushion frame 20.

As shown in FIG. 6, the operation unit 70 operates for rotating the drive gear 71 depending on whether to perform the height adjustment of the seat cushion, and the gear link 60 engaged with the drive gear 71 by the gear teeth 61 receives the rotational power and is rotated on the seat rail 10, so that the cushion frame 20 may be pushed or pulled to move upward/downward.

The drive unit 40 and the operation unit 70 described above may be operated by a controller 80 (see FIG. 1), and the drive unit 40 and the operation unit 70 may be controlled simultaneously or individually as selected.

The height adjustment apparatus may further include the controller 80 operating the drive unit 40 and the operation unit 70, and the controller 80 operates the drive unit 40 and the operation unit 70 for adjusting a height and an angle of the cushion frame such that a hip-point of a seated passenger or driver is changed.

For example, the hip-point of a passenger is a position on which the hip of the passenger is located while the passenger is seated on the seat. According to a form of the present disclosure, during the operation of the drive unit 40 and the operation unit 70, a height and an angle of the cushion frame 20 are adjusted by rotations of the height link 30 and the gear link 60 described above so as to change the hip-point of a passenger, whereby various modes may be performed according to the height and angle of the cushion frame 20.

When the controller 80 operates the drive unit 40 and the operation unit 70 to adjust the height of the cushion frame 20, the plurality of links constituting the height link 30 may be rotated and unfolded by the operation of the drive unit 40 and the gear link 60 is rotated by the operation of the operation unit 70, so that the hip-point may be changed while tracing a curve forward.

Figure 8:
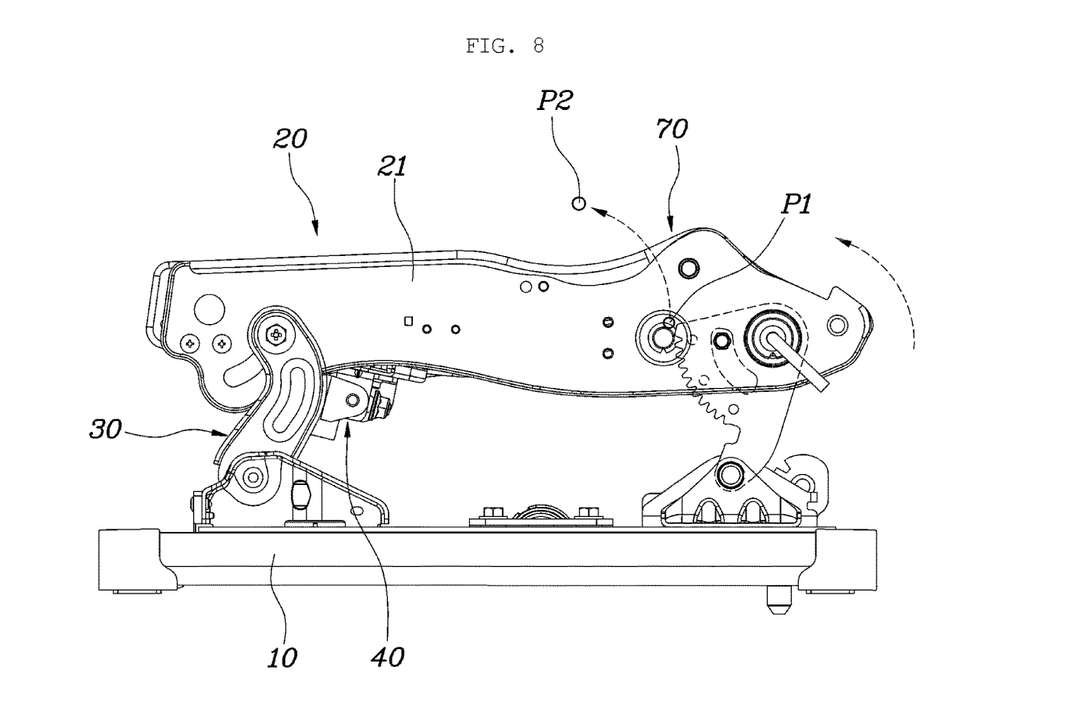

As shown in FIG. 7, when the drive unit 40 and the operation unit 70 do not operate, the first link 31 and the second link 32 of the height link 30 are folded together and the gear link 60 is in a lying state. Accordingly, an initial hip-point P1 is positioned as shown in FIG. 7. In this state, when the drive unit 40 is operated by the controller 80, the height link 30 rotates and folds, and when the operation unit 70 operates, the gear link 60 rotates. In this case, as shown in FIG. 8, the cushion frame 20 moves upward and forward. Accordingly, the hip-point moves from the initial hip-point P1 to a high hip-point P2. In addition, since the hip-point changes while tracing a curve forward, the cushion frame 20 is not interfered with by a seat back frame and a passenger does not feel discomfort in his or her seating posture.

Furthermore, when the controller 80 operates the drive unit 40 so as to adjust the angle of the cushion frame 20, the plurality of links constituting the height link 30 may be rotated and unfolded by the operation of the drive unit 40, so that the hip-point may be changed while tracing a curve rearward.

Figure 9:
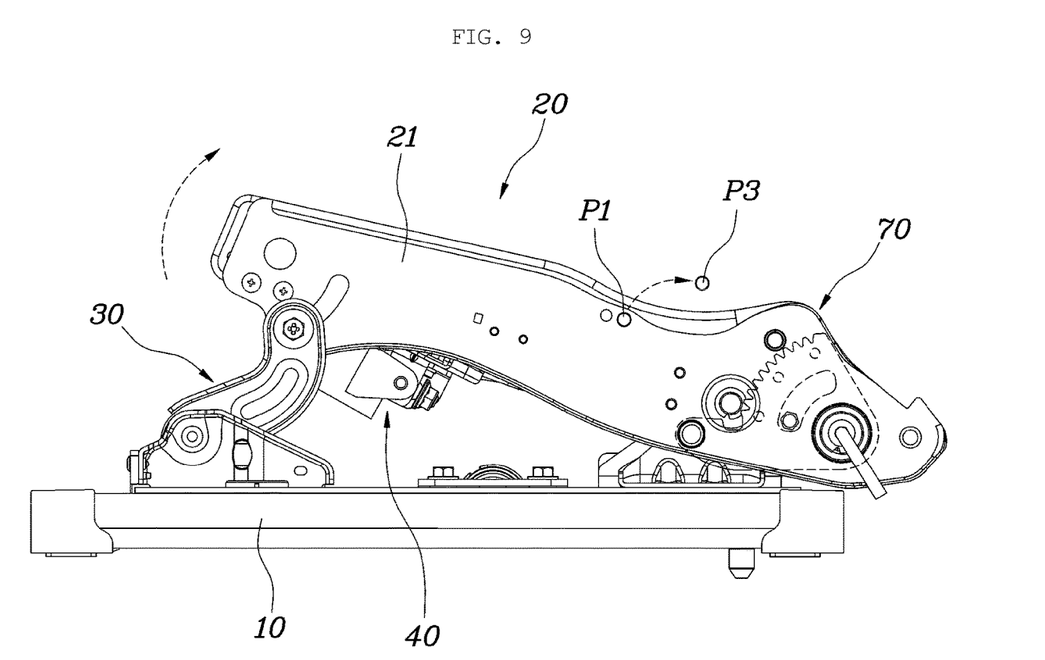

As shown in FIG. 9, when the height adjustment of the cushion frame 20 is performed during the operation of the drive unit 40, the height link 30 rotates and unfolds and thus a front part of the cushion frame lifts. In this case, as shown in FIG. 9, the hip-point moves from the initial hip-point P1 to a release hip-point P3 and the hip-point changes while tracing a curve rearward, so that discomfort due to a change of a seating posture of a passenger is reduced and a seating comfort of the passenger is achieved.

Accordingly, the height adjustment apparatus of the present disclosure, as shown in FIG. 7, may operate in an initial state or an initial mode controlling to arrange the seat cushion at a low position, or as shown in FIG. 8, may operate in a high mode controlling to arrange the height of the seat cushion at a high position by operating the drive unit 40 and the operation unit 70. In addition, as shown in FIG. 9, the height adjustment apparatus of the present disclosure allows the drive unit 40 alone to operate so as to lift the front part of the seat cushion for operating in a relax mode corresponding to a lying posture of a passenger.

Apart from kinds of operation modes shown in FIGS. 7 to 9, the height and angle of the seat cushion corresponding to a posture of a passenger may be variously adjusted by selective operations of the drive unit 40 and the operation unit 70.

According to the height adjustment apparatus of a vehicle seat having a structure described above, during the height adjustment of the seat cushion, a desired tilting angle of the seat cushion is obtained and heights of the front part and a rear part of the seat cushion are individually adjusted, whereby a comfort of the seat is improved due to angles of the seat cushion adjusted in response to various postures of a passenger. In addition, a link connection is structurally secured and its durability is improved.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A height adjustment apparatus of a vehicle seat having a cushion frame, a position of which is adjusted in upward/downward directions on a seat rail, the height adjustment apparatus comprising:
    a height link having a plurality of links, the height link being rotatably coupled to a side frame of the cushion frame and to the seat rail, and allowing the cushion frame to be moved in the upward/downward directions by the plurality of links being unfolded or folded;
    a drive unit provided on the cushion frame, the drive unit including a power transmission part changeable in a length in forward/rearward directions during an operation of the drive unit; and
    a drive mechanism connected to the power transmission part and the height link for operating in cooperation with the drive unit and the height link such that as the length of the power transmission part is increased during the operation of the drive unit, the plurality of links constituting the height link unfolds for the cushion frame to lift,
    wherein the height link includes a first link rotatably provided on the seat rail and a second link rotatably provided on the side frame, and wherein the first link is rotatably coupled to the second link.

2. The height adjustment apparatus of claim 1, wherein a guide slot curvedly extended as an arc shape is provided on the side frame, and a guide part is provided on a connection portion between the first link and the second link of the height link, and
    wherein the guide part is placed in and passes through the guide slot.

3. The height adjustment apparatus of claim 2, wherein after the guide slot extends downward from an upper side thereof, the guide slot is configured to extend in an advancing direction of the power transmission part.

4. The height adjustment apparatus of claim 1, wherein the first link is provided by extending so as to bend upward and a reinforcement bead is provided by bending along an edge of the first link.

5. The height adjustment apparatus of claim 1, wherein the drive unit includes a drive motor fixed to the cushion frame and the power transmission part advancing and withdrawing during an operation of the drive motor, and wherein the drive motor is provided to incline upward such that the power transmission part advances to incline upward.

6. The height adjustment apparatus of claim 1, wherein the drive mechanism includes;
    a rotation link rotatably provided on a front end of the power transmission part;
    a first connection bar, each of opposite ends of which is rotatably connected to a connection portion between the first link and the second link and being in contact with a front end part of the rotation link; and
    a second connection bar, each of opposite ends of which is rotatably connected to a connection portion between the second link and the side frame and being connected to an end part of the rotation link.

7. The height adjustment apparatus of claim 6, wherein the rotation link includes a holding part provided on the front end part thereof such that the first connection bar is placed in the holding part so as to be held in and connected to the holding part.

8. The height adjustment apparatus of claim 6, wherein the first connection bar includes a middle portion being in contact with the front end part of the rotation link and a connection end portion connected to the connection portion between the first link and the second link after each of opposite ends of the first connection bar is bended.

9. The height adjustment apparatus of claim 1, further comprising:
    a gear link having a first end part rotatably connected on the seat rail and a second end part rotatably connected on the cushion frame, the gear link having gear teeth provided on a portion of a circumference of the gear link; and
    an operation unit provided on the cushion frame, the operation unit having a drive gear engaged with the gear teeth of the gear link,
    wherein the gear link is rotated on the seat rail by a rotation of the drive gear during an operation of the operation unit so as to lift and lower the cushion frame.

10. The height adjustment apparatus of claim 9, wherein an extension slot is provided on the gear link and the extension slot is extended curvedly along a curve of the gear teeth that is extended, and
    a protrusion is provided on the side frame so as to be placed in the extension slot.

11. The height adjustment apparatus of claim 9, wherein the height link, the drive unit, and the drive mechanism are provided on front portions of the seat rail and the cushion frame, and
    the gear link and the operation unit are provided on rear portions of the seat rail and the cushion frame.

12. The height adjustment apparatus of claim 9, further comprising:
    a controller controlling the drive unit and the operation unit,
    wherein the controller operates the drive unit and the operation unit so as to adjust a height and an angle of the cushion frame such that a hip-point of a seated passenger is changed.

13. The height adjustment apparatus of claim 12, wherein when the controller operates the drive unit and the operation unit to adjust the height of the cushion frame, the plurality of links constituting the height link is rotated and unfolded by the operation of the drive unit and the gear link is rotated by the operation of the operation unit, so that the hip-point is changed while tracing a curve forward.

14. The height adjustment apparatus of claim 12, wherein when the controller operates the drive unit so as to adjust the angle of the cushion frame, the plurality of links constituting the height link is rotated and unfolded by the operation of the drive unit, so that the hip-point is changed while tracing a curve rearward.

* * * * *